United States Patent
Sumitani et al.

(10) Patent No.: US 6,755,444 B2
(45) Date of Patent: Jun. 29, 2004

(54) SLIM-TYPE THREADED JOINT FOR OIL WELL PIPES

(75) Inventors: Katsutoshi Sumitani, Amagasaki (JP); Jun Maeda, Ashiya (JP); Shigeo Nagasaku, Nishinomiya (JP)

(73) Assignees: Sumitomo Metal Industries, Ltd., Osaka (JP); Vallourec Mannesmann Oil & Gas France, Aulnoye-Aymeries (FR)

( * ) Notice: Subject to any disclaimer, the term of this patent is extended or adjusted under 35 U.S.C. 154(b) by 0 days.

(21) Appl. No.: 10/251,881

(22) Filed: Sep. 23, 2002

(65) Prior Publication Data

US 2004/0075275 A1 Apr. 22, 2004

Related U.S. Application Data

(63) Continuation of application No. PCT/JP01/02609, filed on Mar. 29, 2001.

(30) Foreign Application Priority Data

Mar. 30, 2000 (JP) .................................... P2000-094020

(51) Int. Cl.[7] .............................................. F16L 25/00
(52) U.S. Cl. ........................................ 285/334; 285/390
(58) Field of Search ................................ 285/333, 334, 285/390, 355

(56) References Cited

U.S. PATENT DOCUMENTS 3,508,771 A * 4/1970 Duret .......................... 285/334
4,161,332 A * 7/1979 Blose .......................... 285/334
4,192,533 A * 3/1980 Blose .......................... 285/334
4,373,754 A * 2/1983 Bollfrass et al. ............. 285/334
4,696,498 A * 9/1987 Church ........................ 285/334
4,707,001 A * 11/1987 Johnson ....................... 285/334
4,753,460 A * 6/1988 Tung ........................... 285/334
4,796,928 A * 1/1989 Carlin et al. ................. 285/334
5,092,635 A * 3/1992 DeLange et al. ............. 285/334
5,419,595 A * 5/1995 Yamamoto et al. .......... 285/334
5,829,797 A * 11/1998 Yamamoto et al. .......... 285/334

FOREIGN PATENT DOCUMENTS

| FR | 7622543 | | 7/1976 | |
| GB | 2064041 | * | 6/1981 | ................. 285/334 |
| JP | 10-089554 | | 4/1998 | |

* cited by examiner

Primary Examiner—Eric K. Nicholson
(74) Attorney, Agent, or Firm—Clark & Brody

(57) ABSTRACT

A threaded joint for oil well pipes is provided which can guarantee a joint efficiency sufficient for practical use in deep wells, which has a decreased joint outer diameter, and which has an improved bending resistance, compression resistance, and over-torque resistance which are sufficient for use by the side track technique. It is an integral threaded joint for oil well pipes in which it has a joint efficiency of at least 70%, the outer diameter of the joint is larger than and at most 1.08 times the outer diameter of the oil well pipe bodies, and the threaded portions have a cross section of a trapezoidal shape with a load flank angle ($\alpha$) of the threads in the range of 0 to $-20$ degrees and a stabbing flank angle ($\theta$) thereof in the range of 35 to 50 degrees.

11 Claims, 1 Drawing Sheet

SLIM-TYPE THREADED JOINT FOR OIL WELL PIPES

This application is a continuation of International Application No. PCT/JP01/02609, filed Mar. 29, 2001.

TECHNICAL FIELD

This invention relates to a threaded joint for oil well pipes or gas well pipes which are buried deep in the ground for recovery of natural gas or crude oil from underground. In particular, it relates to a slim-type threaded joint for oil well pipes having a small outer diameter of the joint.

BACKGROUND ART

Today, wells for natural gas and crude oil are becoming deep ones having a depth reaching several thousand meters. Threaded joints are widely used for connecting oil well pipes and gas well pipes (collectively referred to below as oil well pipes) for use in such oil wells and gas wells.

In recent years, as the price of natural gas and crude oil has been decreasing, digging of new wells has been performed with a decreased bore diameter of the wells in order to decrease the cost of well development. Reuse of dried-up old wells has also been employed for cost saving using the side track technique in which a hole is formed in the casing pipe of an old well and a tubing pipe is inserted through the hole and advanced to an oil-bearing layer.

In these situations, it is effective to use a slim-type threaded joint, which is a joint having a small outer diameter.

Such a slim-type threaded joint for oil well pipes is disclosed in JP-A 10-89554 (1998). It is an integral-type threaded joint for oil well pipes having threaded portions for threaded engagement of a pin portion and a box portion, metal seal portions for maintaining gastightness, and torque shoulders for regulating the fastening torque. The strength of the torque shoulder portions is made higher than that of other portions of the joint and of the oil well pipe body with the object of increasing resistance to compression. The Japanese publication shows an example in which a torque shoulder portion is located at the center of a threaded portion.

Another form of a slim-type threaded joint is shown in French Patent 7622543. In this case, the outer diameter of the joint is decreased by expanding one end of an oil well pipe body to form a threaded box portion of the joint and swaging the other end of the pipe to form a threaded pin portion thereof.

DISCLOSURE OF THE INVENTION

It is true that with such conventional technology, it is possible to make the outer diameter of a joint slimmer. However, there is a limit to the effect which can be obtained with the above-described conventional slim-type joints, and they have the following problems.

First, the area ratio of the smallest cross-sectional area of the joint which is the critical cross section thereof to the cross-sectional area of the oil well pipe body is small, so the joint strength is low.

In addition, the conventional slim-type joints are not adequate in compression resistance, bending resistance, and over-torque resistance.

The object of the present invention is to provide a threaded joint which can guarantee a joint efficiency which is sufficient for practical use in deep wells, which has a decreased joint outer diameter, and which has an improved bending resistance, compression resistance, and over-torque resistance which are necessary for a side track design.

As a result of various investigations aimed at achieving the object, the present inventors found that by employing a combination of the following structures, a slim-type joint for oil well pipes can be manufactured for the first time which slims down the outer diameter of a threaded joint to at most 1.08 times the outer diameter of an oil well pipe body, which can guarantee a high strength of a joint efficiency of at least 70%, and which has excellent. bending resistance, compression resistance, and over-torque resistance, and they accomplished the present invention.

(i) The thread shape for female and male threads of a joint has a trapezoidal cross section with a load flank angle ($\alpha$) of 0 to −20 degrees and a stabbing flank angle ($\theta$) of 35 to 50 degrees.

(ii) A torque shoulder for regulating the fastening torque is located on the external surface side of an oil well pipe. Preferably it has a shape which is substantially perpendicular to the axis of the pipe.

(iii) A seal portion for guaranteeing gastightness against internal pressure or external pressure or both applied to an oil well pipe is located on the internal surface side of the oil well pipe.

Preferably, a joint is constituted by forming the above-described thread shape on an API EUE (External Upset End) pipe.

Accordingly, the present invention is as follows.

(1) A slim-type integral joint for oil well pipes having female and male threaded portions for threadingly joining a pin portion and a box portion, and metal seal portions located on the internal surface side of oil well pipes for guaranteeing gastightness against internal pressure or external pressure or both applied to the oil well pipes, and further having torque shoulder portions located on the external surface sides of the oil well pipes for regulating fastening torque, characterized in that it has a joint efficiency of at least 70%, the outer diameter of the joint is larger than and at most 1.08 times the outer diameter of the oil well pipe bodies, and the threaded portions have a cross section of a trapezoidal shape with a load flank angle of the threads in the range of 0 to −20 degrees and a stabbing flank angle thereof in the range of 35 to 50 degrees.

(2) A slim-type joint for oil well pipes as described above in (1) wherein the cross-sectional shape of the torque shoulder portions extends substantially perpendicular to the axis of the pipes.

(3) A slim-type joint for oil well pipes obtained by forming threads as described above in (1) or (2) on API EUE (External Upset End) pipes.

(4) A slim-type joint for oil well pipes as described above in any of (1) to (3) wherein the load flank angle ($\alpha$) of the threads is 0 to −15 degrees.

(5) A slim-type joint for oil well pipes as described above in any of (1) to (4) wherein the stabbing flank angle ($\theta$) of the threads is 40 to 50 degrees.

An integral threaded joint for oil well pipes used herein means a threaded joint for oil well pipes which threadingly connects oil well pipes, each pipe having a pin portion at its one end in which a thread is formed on the external surface of the pipe and a box portion at its opposite end in which a thread is formed on the internal surface of the pipe.

BEST MODE FOR CARRYING OUT THE INVENTION

The present invention will be described below while referring to the attached drawings.

Figure 1:
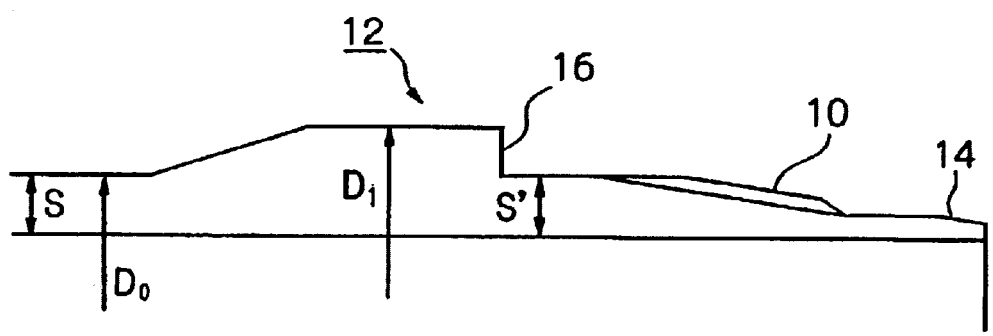
FIG. 1 is a schematic partial cross-sectional view for illustrating the overall structure of a threaded joint.

FIG. 1 is a schematic diagram showing the overall structure of a threaded joint according to the present invention.

A threaded joint according to the present invention is an integral threaded joint for oil well pipes in which a pin portion and a box portion are formed on opposite ends of each oil well pipe body, each of the pin and box portions having a threaded portion.

The pin portion and the box portion are threadingly coupled by female and male threads. In the illustrated example, only the pin portion 12 having a threaded portion 10 on the end of an oil well pipe body is shown, but a box portion is omitted since it is self-evident to one skilled in the art from the explanation in the present description.

According to the present invention, a threaded joint for oil well pipes further has a metal seal portion 14 on the internal surface side of an oil well pipe for guaranteeing gastightness against internal pressure or external pressure or both. In addition, a torque shoulder portion 16 for regulating fastening torque is provided on the external surface side of the oil well pipe.

The advantage of locating a torque shoulder portion on the external surface side of an oil well pipe is that compared to the case when a torque shoulder portion is located at the center of the threads or on the internal surface side of the pipe, it is easy to keep a large area for the torque shoulder portion. Accordingly, the resistance to compression, the resistance to bending, and the resistance to over-torque can be increased. In addition, it is also important that the fastened condition of a threaded joint for oil well pipes can be easily ascertained from outside the pipes. The cross-sectional shape of the torque shoulder portion preferably extends substantially perpendicular to the axial direction of the pipe.

The reason why the cross-sectional shape of the torque shoulder portion is preferably substantially perpendicular to the axial direction of the pipe is as follows.

If the cross-sectional shape of the torque shoulder portion does not extend substantially perpendicularly, in a state where the joint is fastened with an over-torque, a force in the radial direction of the pipes acts on the torque shoulder portion of the pin or the torque shoulder portion of the box to cause it to easily deform. In contrast, when the cross-sectional shape of the torque shoulder portion extends substantially perpendicularly, it is difficult for such deformation to take place, so the over-torque resistance and the compression resistance are increased.

The joint outer diameter is shown by $D_1$, and the joint efficiency is defined by the ratio ($S'/S$) of the cross-sectional area $S'$ in the location where the cross section of the joint portion is smallest to the cross-sectional area $S$ of the oil well pipe body.

The joint efficiency indicates the strength of the joint relative to the pipe body. Accordingly, a joint efficiency of 100% means that the strength of the joint is the same as that of the pipe body.

In the present invention, although there is some variation with the wall thickness of the pipe body, the joint efficiency or the strength is at least 70% relative to the pipe body. The joint efficiency can also be expressed as the ratio of the cross-sectional area of the most critical location of the joint, i.e., the location having the smallest cross-sectional area such as the portion where the threads get free from engagement at the end of the threaded portion with respect to the cross-sectional area of the pipe body.

The smaller the joint efficiency, the lower is the strength of the joint. Accordingly, the joint efficiency is preferably as large as possible, but to that extent the outer diameter of the joint increases, and it becomes difficult to obtain a slim-type joint. In the case of the present invention, with an integral joint in which a male thread is formed on one end of a pipe and a female thread is formed on the other end of the pipe, it is possible to achieve slimming by having a joint efficiency on the order of 70%.

According to a preferred mode of carrying out the present invention, API EUE (External Upset End) pipes are used as pipes for forming such threads. They are pipes in which the wall thickness is increased only on the external surface side or outwardly at both ends of a pipe. Using such pipes, a threaded joint for oil well pipes having a joint efficiency of at least 70% and a joint outer diameter which is larger than but at most 1.08 times as large as the outer diameter of the oil well pipe body can be easily manufactured.

Figure 2:
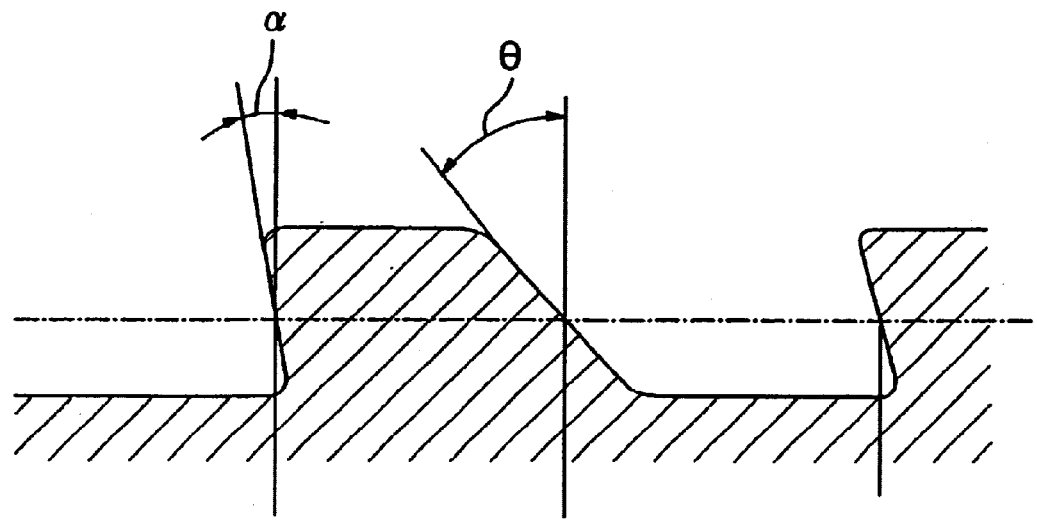
FIG. 2 is a schematic partial cross-sectional view for illustrating the thread shape.

FIG. 2 is an enlarged view of a portion of a male thread of a threaded joint. In the figure, a threaded portion having a trapezoidal cross section is defined with a load flank angle ($\alpha$) and a stabbing flank angle ($\theta$). The load flank angle ($\alpha$) of the thread is measured in the clockwise direction, and in the present invention it is in the range of 0 to −20 degrees. On the other hand, the stabbing flank angle ($\theta$) is measured in the counterclockwise direction, and in the present invention, it is in the range of +35 to +50 degrees. Preferably, $\alpha$=0 to −15 degrees and $\theta$=+40 to +50 degrees.

If the load flank angle is smaller than −20 degrees, i.e., if the absolute value of the negative value becomes larger than 20, it becomes easy for working flaws such as burrs to be formed in the vicinity of this flank portion at the time of cutting operations to form a thread, so it is at least −20 degrees. Preferably it is at least −15 degrees.

The stabbing flank angle is 35 to 50 degrees in order to improve stability at the time of stabbing. This is because if it is less than 35 degrees or greater than 50 degrees, it becomes disadvantageous from the following standpoints. Namely, when the stabbing flank angle is less than 35 degrees, at the time of stabbing, if the longitudinal axes of the pipes of the pin portion and of the box portion are not aligned and are deviated from each other at some angle, it is difficult to restore them to a proper stabbed state in which the longitudinal axes of the pipes are aligned with each other. On the other hand, if the stabbing flank angle exceeds 50 degrees, the cross section of the thread becomes small so that the strength of the threads decreases.

If the outer diameter of the joint is greater than 1.08 times the outer diameter of the pipe body, when processing is carried out to increase the wall thickness of the ends of a pipe, the amount of wall thickness to be increased is so large that processing becomes difficult and the manufacturing costs of a pipe increase.

In the present invention, when using an API EUE pipe for working, the outer diameter of the upset portion can be easily made at most 1.08 times.

The reason why it is preferred to use an EUE pipe is that in the case of working to make an upset pipe, a large amount of working can be attained by working to increase outwardly the wall thickness of a pipe end forming an external upset end or EUE, and the working cost is lower than when making a heavy upset pipe in which working is performed on pipe ends also to increase the wall thickness inwardly.

The operation and effects of the present invention will be described below more specifically by means of examples.

EXAMPLES

API EUE oil well pipes having a pipe body with an outer diameter of 101.6 millimeters and a wall thickness of 6.65 millimeters were prepared. Threads according to this invention were formed as shown in FIG. 1 and FIG. 2, and an integral threaded joint for an oil well pipe comprising a pin portion and a box portion was manufactured.

The following tests were performed thereon.

As a comparative example, threads were formed on ordinary pipes having an outer diameter of 101.6 millimeters and a wall thickness of 6.65 millimeters to manufacture an integral threaded joint for oil well pipes, and tests were carried out thereon. The tests were carried out in accordance with test methods specified by API.

[Tensile Fracture Test]

A tensile load was applied to an entire test assembly including a fastened joint in the axial direction of the pipes, and evaluation was carried out based on the load at the time of fracture.

[Compression Resistance Test]

While a test assembly was subjected to an internal pressure with gas, tensile and compressive loads were repeatedly applied in the axial direction of the pipes, and the compressive load at the time when leakage began to occur due to the internal pressure was measured. Based on the value of this compressive load, the ratio with respect to the yield load of the joint was calculated and used for evaluation.

[Bending Resistance Test]

While a test assembly was subjected to an internal pressure and a tensile load in the axial direction of the pipes, a mechanical bending force was applied to the test assembly, and the bending angle at which leakage began to occur due to the internal pressure was measured. The bending resistance was evaluated by the bending angle per 100 feet (30.48 meters) of length.

[Over-torque Resistance Test]

Fastening of a joint was continued after the torque shoulder portion of the pin and the torque shoulder portion of the box were made to contact each other, and evaluation was carried out based on the value of the torque at the time of yielding of the torque shoulder portions.

The test results are summarized in Table 1.

Tensile fracture of the example of this invention occurred in an incomplete thread portion of the pin, and the load at this time was 78% of the tensile fracture load of the oil well pipe bodies. This value was greatly increased compared to the value of 55% for the comparative example. In addition, it was a value which exceeded the value of approximately 74% anticipated from the value of the joint efficiency for the example of this invention.

With respect to compression resistance, while it was 40% of the value for the oil well pipe bodies for the comparative example, in the example of this invention, 80% of the value for the oil well pipe bodies was obtained, so excellent performance which was two times that of the comparative example was exhibited.

With respect to bending resistance, the bending angle was 10 degrees for the comparative example, but for the example of this invention, a value of 60 degrees for the bending angle was obtained, so extremely good performance of six times the value of the comparative example was obtained.

As for over-torque resistance, when the torque value for the comparative example was set at 1.0, a torque value of 2.0 was obtained for the example of this invention, so excellent performance which was two times that of the comparative example was obtained.

TABLE 1

| | Thread shape | | | | Results | | |
|---|---|---|---|---|---|---|---|
| | Joint efficiency (%) | $D_1/D$ | α (degrees) | θ (degrees) | Bending resistance | Compression resistance | Over-torque resistance |
| This invention | 74 | 1.06 | −15 | +45 | 60° | 80% | 2.0 |
| Comparative Example | 55 | 1.0 | −15 | +45 | 10° | 40% | 1.0 |

(Notes)
α: load flank angle
θ: stabbing flank angle
bending resistance: bending angle per 100 feet
over-torque resistance: an index relative to a torque value of 1.0 for the Comparative Example
$D_1/D_0$: ratio of the outer diameter of joint ($D_1$) to that of the oil well pipe body ($D_0$)

Industrial Applicability

According to the present invention, (i) by forming threads on an API EUE pipe, the outer diameter of a joint can be decreased and the joint efficiency can be increased, (ii) by increasing the area ratio of the shoulder portions, the compression performance and the over-torque performance can be improved, and (iii) by utilizing a structure in which the load flank angle is a negative angle, the joint strength can be increased. By a synergistic effect of combining these factors, a threaded joint can be provided which has a high joint efficiency, which has a small joint outer diameter, and which has good bending resistance, compression resistance, and over-torque resistance.

What is claimed is:

1. A slim-type integral joint for oil well pipes having female and male threaded portions for threadingly joining a pin portion and a box portion, and metal seal portions located on the internal surface side of oil well pipes for guaranteeing gastightness against internal pressure or external pressure or both applied to the oil well pipes, and further having torque shoulder portions located on the external surface sides of the oil well pipes for regulating fastening torque, characterized in that it has a joint efficiency of at least 70%, an outermost diameter of the joint being larger than and at most 1.08 times an outermost diameter of the oil well pipe bodies, and the threaded portions have a cross section of a trapezoidal shape with a load flank angle (α) of the threads in the range of 0 to −20 degrees and a stabbing flank angle (θ) thereof in the range of 35 to 50 degrees.

2. A slim-type joint for oil well pipes as claimed in claim 1 wherein the cross section shape of the torque shoulder portions extends substantially perpendicular to the axial direction of the pipes.

3. A slim-type joint for oil well pipes obtained by forming threads as claimed in claim 1 on API EUE (External Upset End) pipes.

4. A slim-type joint for oil well pipes as claimed in claim 1 wherein the load flank angle (α) of the threads is 0 to −15 degrees.

5. A slim-type joint for oil well pipes as claimed in claim 1 wherein the stabbing flank angle (Θ) if the threads is 40 to 50 degrees.

6. A slim-type joint for oil well pipes obtained by forming threads as claimed in claim 2 on API EUE (External Upset End) pipes.

7. A slim-type joint for oil well pipes as claimed in claim 2 wherein the load flank angle (α) of the threads is 0 to −15 degrees.

8. A slim-type joint for oil well pipes as claimed in claim 3 wherein the load flank angle (α) of the threads is 0 to −15 degrees.

9. A slim-type joint for oil well pipes as claimed in claim 2 wherein the stabbing flank angle (Θ) if the threads is 40 to 50 degrees.

10. A slim-type joint for oil well pipes as claimed in claim 3 wherein the stabbing flank angle (Θ) if the threads is 40 to 50 degrees.

11. A slim-type joint for oil well pipes as claimed in claim 4 wherein the stabbing flank angle (Θ) if the threads is 40 to 50 degrees.

* * * * *

UNITED STATES PATENT AND TRADEMARK OFFICE
CERTIFICATE OF CORRECTION

PATENT NO.    : 6,755,444 B2
DATED         : June 29, 2004
INVENTOR(S)   : Sumitani et al.

It is certified that error appears in the above-identified patent and that said Letters Patent is hereby corrected as shown below:

Column 7,
Line 2, the word "if" should read -- of --.

Column 8,
Lines 2, 5 and 8, the word "if" should read -- of --.

Signed and Sealed this

Twenty-eighth Day of September, 2004

JON W. DUDAS
*Director of the United States Patent and Trademark Office*